Feb. 26, 1952  R. V. KEERAN  2,586,828
RADIO BUOY
Filed Jan. 19, 1950  3 Sheets-Sheet 1
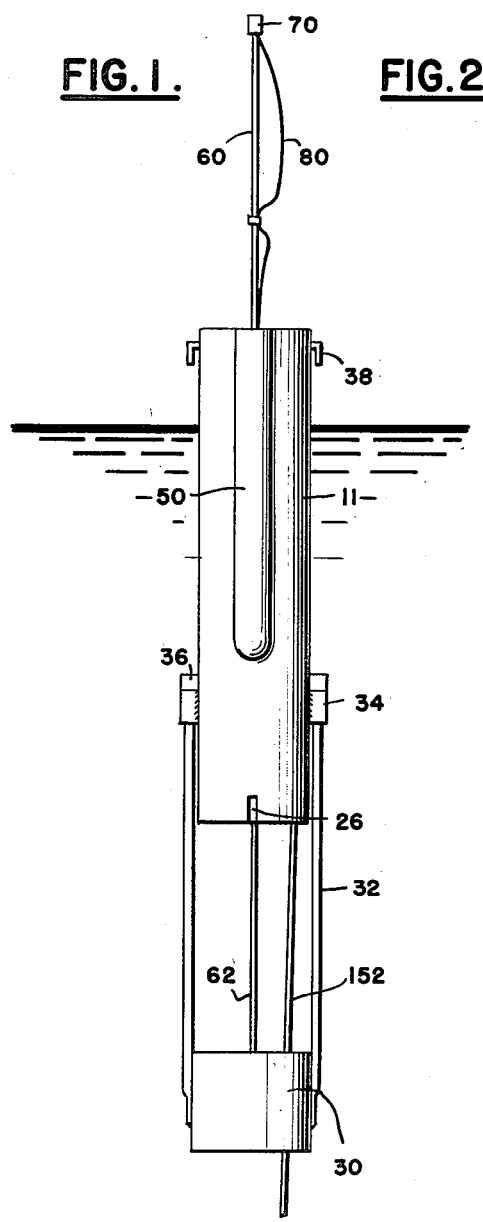
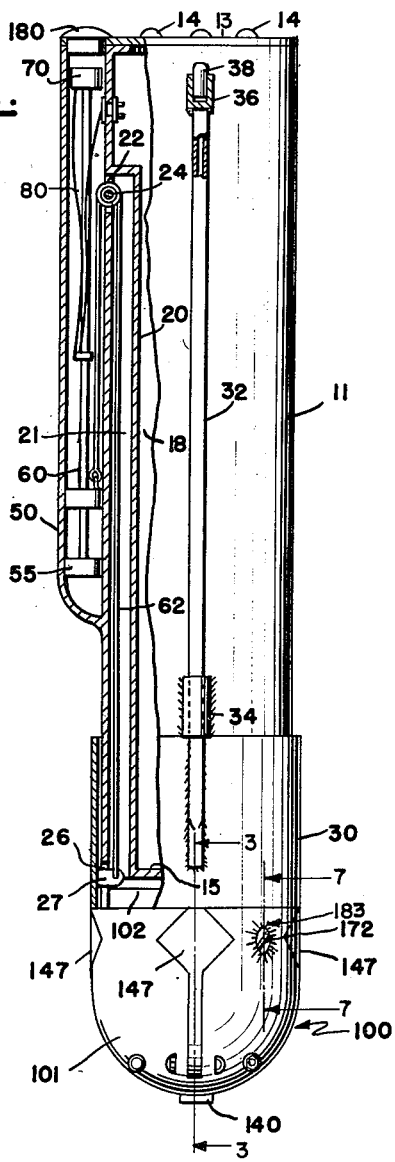
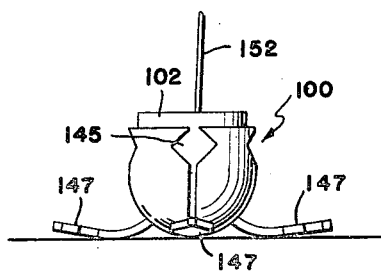
INVENTOR
ROYAL V. KEERAN
BY
ATTORNEY Feb. 26, 1952 R. V. KEERAN 2,586,828
RADIO BUOY
Filed Jan. 19, 1950 3 Sheets-Sheet 2
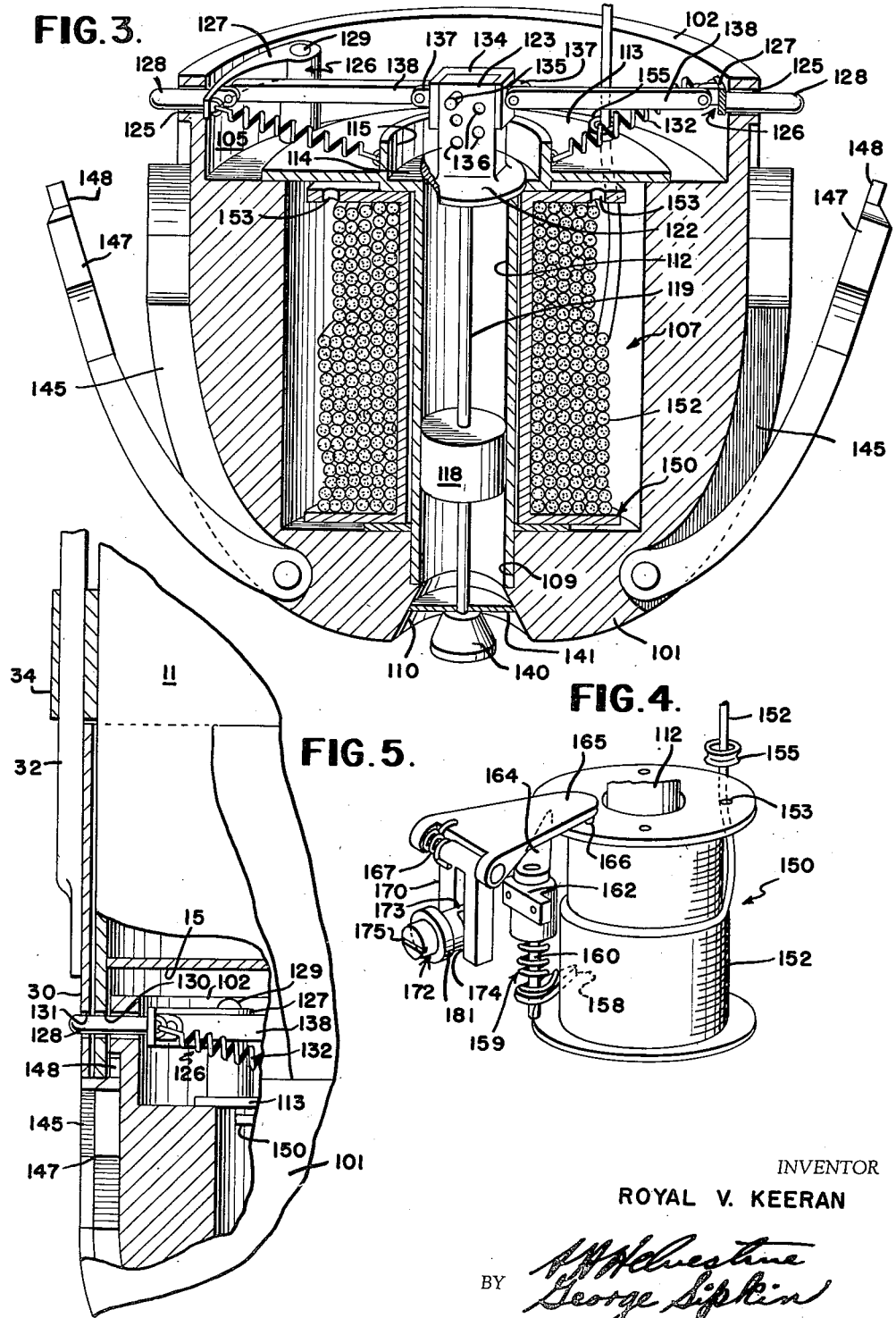
INVENTOR
ROYAL V. KEERAN
BY
ATTORNEYS Feb. 26, 1952 R. V. KEERAN 2,586,828
RADIO BUOY
Filed Jan. 19, 1950 3 Sheets-Sheet 3
FIG.6.
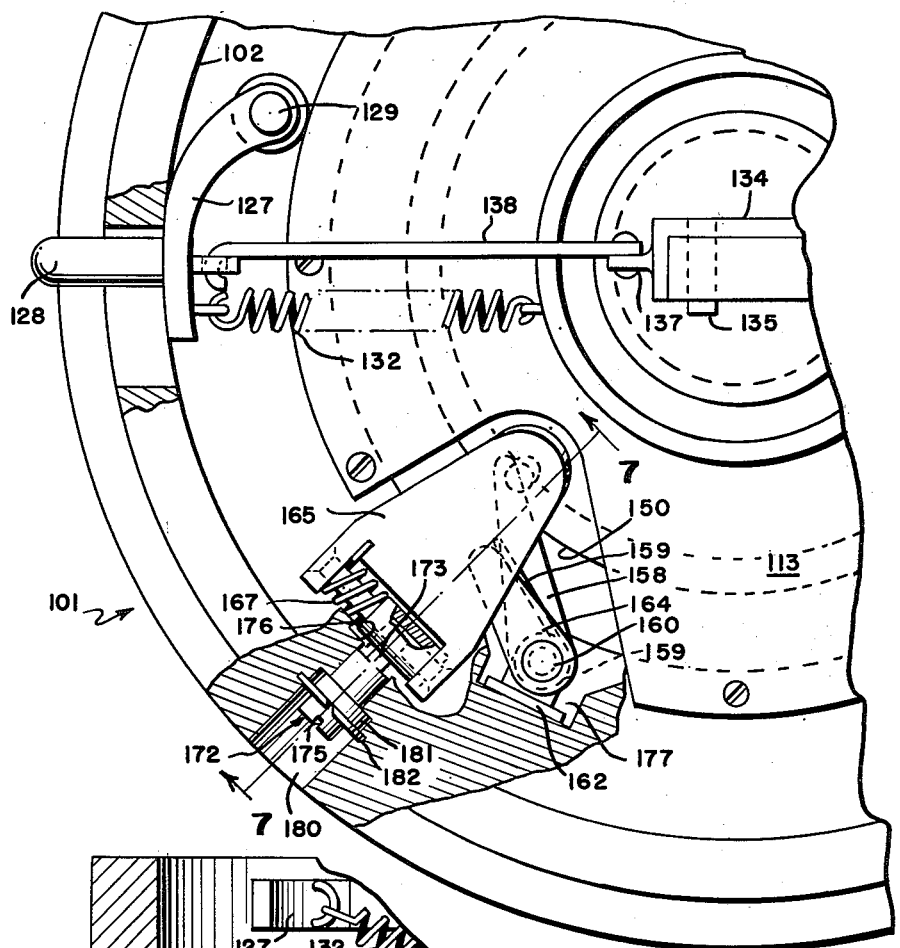
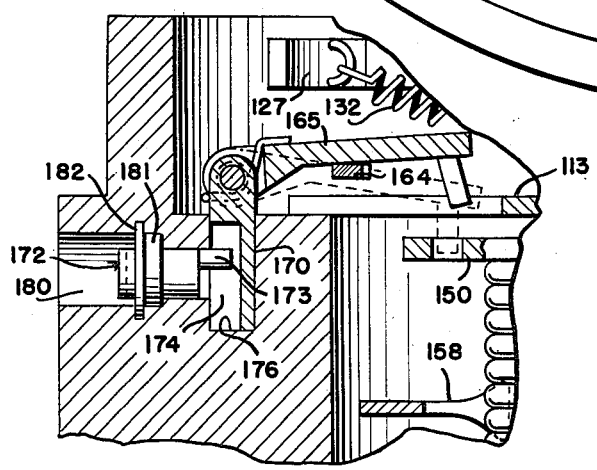
FIG.7.
INVENTOR
ROYAL V. KEERAN Patented Feb. 26, 1952

2,586,828

UNITED STATES PATENT OFFICE 2,586,828

RADIO BUOY

Royal V. Keeran, San Diego, Calif.

Application January 19, 1950, Serial No. 139,481

7 Claims. (Cl. 9—8)

(Granted under the act of March 3, 1883, as amended April 30, 1928; 370 O. G. 757)

The present invention relates to a radio buoy, and more particularly to a moored buoy adapted to be launched from an airplane or from a surface vessel.

Presently available radio buoys are adapted to be launched from an aircraft in flight, but are not generally stable in rough water and are not adapted to be moored in a particular location so that they drift with ocean currents. Such buoys are not suitable for accurately marking a desired location for more than a few minutes after being dropped.

In addition, the buoys available at present employ complicated mechanisms for erecting the radio antenna, and are not usually adaptable for interchangeable use with either an aircraft or a surface vessel.

The buoy herein described is equipped with a stabilizer which is suspended below the buoy to maintain the antenna in a substantiallly vertical position when the buoy is in the water. The stabilizer is adapted to be telescoped over the body of the buoy prior to launching, and the movement of the stabilizer to its operative position erects the antenna. The stabilizer is maintained in a telescoped position prior to launching by means of an anchor secured to the lower end of the buoy body and released therefrom by impact of the buoy with the water.

In transporting radio buoys to a desired location it is frequently necessary to employ fighter aircraft, and on such airplanes, the buoy must be carried outside the aircraft where it is exposed to the slip-stream of the propeller. The release mechanism for the anchor must therefore be insensitive to wind velocities of several hundred miles an hour in addition to sudden movements of the aircraft in evasive action or rough air. However, such an insensitive mechanism would not operate at all if launched from a small boat. The release mechanism described in the present case is adjustable so as to be easily regulated to suit a wide variety of launching conditions.

In certain applications, it is necessary to maintain radio buoys in a particular location from which they do not drift. Presently available buoys are not usually equipped with anchors or other mooring devices, and where they are so equipped, the mechanism is not readily settable to different lengths of mooring lines. In the present invention, the anchor contains a reel having an adjustable stop mechanism which is readily adjusted from the exterior of the buoy.

It is an object of the present invention to provide a highly stable buoy adapted to be moored in a desired location.

It is a further object of the present invention to provide a buoy which may be launched from aircraft or from surface vessels interchangeably.

It is a still further object of the present invention to provide a radio buoy which is capable of automatic erection and which requires only simple operating mechanisms.

Further objects and advantages of the present invention will be made more apparent by reference to the following description and to the appended drawings in which Fig. 1 is a view of the buoy in operating in the water;

Fig. 2 is an elevation view, partially in section, of the buoy of the present invention;

Fig. 3 is a sectional view of the anchor of the present invention, showing the release mechanism employed;

Fig. 4 is a phantom view of the anchor line stop mechanism employed in the present invention;

Fig. 5 is a detail view partially in section showing the function of the release mechanism of Fig. 3;

Fig. 6 is a fragmentary plan view partly in section illustrating the anchor line stop mechanism; and Fig. 7 is a fragmentary view of the anchor body taken on line 7—7 of Figs. 2 and 6.

Referring now to Fig. 1 of the drawings, the buoy body 11 is supported in a vertical position with its upper end above the water by its buoyancy. The stabilizer 30 is supported by means of tubes 32 passing through the sleeves 34 attached to the buoy body 11. The antenna support tube 50 is attached to the side of the buoy body and the antenna mast 60 extends from the open top of the support tube, with the antenna 70 mounted on top of the mast and the lead-in cable 80 extending along the mast 60.

The anchor 100 is shown in its extended position resting on the bottom of the ocean. The flukes 147 are extended from the anchor and the anchor line 152 is attached to the bottom of the buoy body 11. If the buoy drifts away from its location, the anchor 100 is tilted so as to bring one or more of the flukes 147 in contact with the ground which dig into the bottom to prevent displacement thereof.

Fig. 2 shows the buoy in its packed position before launching. The antenna 70 is folded and pushed into the antenna support tube 50 together with the antenna mast 60. The antenna lead-in cable 80 folds itself as the mast is inserted in the support tube by attachment to the mast at approximately its center. The bottom end of the antenna mast is provided with a suitable means for slidably engaging the inside of the antenna support tube 50 such as the spaced discs 55. These discs fit the support tube 50 snugly to prevent excessive antenna play and to prevent the antenna from retracting itself by its own weight.

The buoy body 11 is provided with a removable cover 13 fastened in place by means of a number of screws 14 to provide a water-tight joint. A plate 15 is secured near the lower end of the body to seal the body into a water-tight chamber 18 adapted to receive radio equipment and batteries.

The radio equipment installed in the buoy body 11 may be of any desired type, and will depend upon the purpose of the buoy. The radio equipment per se is not part of the present invention and therefore is not described herein. The power supply for the equipment would consist of batteries also carried in the compartment 18.

A partition 20 is sealed in the buoy body 11 to provide a longitudinal passage 21 passing through the plate 15 to a point near the upper end of the buoy, the partition 20 and the plate 15 being secured by welding or other suitable means. A slot 22 is cut in the side walls between the antenna support tube 50 and the buoy body 11 near the upper end of the longitudinal passage created by the partition 20, and a pulley 24 is rotatably mounted in the slot.

A slot 26 is cut in the buoy body 11 in longitudinal alignment with the longitudinal passage 21 created by the partition 20 and is adapted to receive the horn 27 attached to the stabilizer 30 when the stabilizer is in its retracted position. A cable 62 is attached to the discs 55 of the antenna mast 60 and to the horn 27, passing over the pulley 24 and through the passage 21. Thus, when the stabilizer 30 moves to its extended position, the antenna mast 60 is pulled up out of the support tube 50 by the cable 62.

The stabilizer 30 is a cylindrical tube having an inside diameter of a size to slide freely over the buoy body 11. The tubes 32 are welded to the sides of the stabilizer 30 at their lower ends and pass freely through the sleeves 34 welded to the buoy body. The upper end of each of the tubes 32 is fitted with a short collar 36 which fits over the gooseneck projections 38 welded to the buoy body 11 near its upper end and also prevents the tubes 32 from sliding out of the sleeves 34.

The anchor 100 comprises a cylindrical body 101 rounded at its lower end to a streamlined shape and having an outside diameter substantially equal to the outside diameter of the stabilizer 30. The anchor body is adapted to extend within a depression formed by securing plate 15 a short distance above the lower end of the buoy body 11 and is provided with an upwardly extending flange 102 of a diameter to fit inside the depression. The interior of the anchor body 101 contains three coaxial cavities one above the other. The upper cavity 105 has a diameter equal to the inside diameter of the flange 102 and extends only to a sufficient depth to accommodate the release mechanism hereinafter described. The intermediate cavity 107 comprises a cylindrical bore having a diameter of about one-half the diameter of the anchor body extending to a depth in excess of its diameter and adapted to receive the mooring line mechanism later to be described. The lower cavity consists of a hole 109 extending through the lower end of the anchor body 101 and has a diameter of about one quarter that of the intermediate cavity, the lower end of the hole being flared to produce a funnel 110 which collects a considerable volume of water during a vertical descent of the buoy in the water. A pintle tube 112 is adapted to fit snugly within the hole 109 in bottom of the anchor body and to extend vertically through the intermediate cavity 107 to a support plate 113 removably secured in the upper cavity 105 and to which the pintle tube is fastened by welding or other suitable means. The pintle tube 112 is expanded at its junction with the support plate 113 to form an internal shoulder 114, and extends through the plate to provide a flange 115.

The piston 118 is slidably fitted inside the pintle tube 112 and is provided with a piston rod 119 extending upward within the tube. The cap 122 having a diameter suitable to engage the shoulder 114 and carrying the post 123 is attached to the upper end of the piston rod 119. The piston 118, the piston rod 119, and the cap 122 are adapted to move vertically as a unit, the cap 122 providing a positive stop in the downward direction.

The flange 102 at the top of the anchor body 101 is provided with a pair of diagonally opposed holes 125 extending through it in a horizontal direction, and a pair of latches 126 are positioned adjacent the holes 125. The latch 126 comprises an arm 127 having thereon a pin 128 adapted to fit through the holes 125, the arm being pivoted about the vertical shaft 129. When the arms 127 are pivoted inwardly, the pins 128 are withdrawn from the holes 125, and the springs 132 are connected between the arms 127 and the flange 115 to urge the arms inward.

A block 134 is adapted to be attached to the post 123 by means of the pin 135 passing through one of the holes 136 in the post, and carries a pair of pivot points 137 thereon. A pair of struts 138 are pivotally attached between the arms 127 and the pivot points 137 on the block 134 to control the movement of the arms 127. If the pivot points 137 are moved below the axis through the connections of the struts 138 to the arms 127, the springs 132 force the cap 122 against the shoulder 114 and lock the pins 128 in the holes 123, since the action is then "over center."

The force required on the piston 118 to move the pivot points 137 over center will depend upon the displacement of the block 134 from the axis, the further removed, the larger the force required. The holes 136 in the post 123 are provided to allow the required pressure to be regulated, the position determined by the top holes requiring negligible force and lower holes requiring larger forces. The lower ends of the buoy body 11 and the stabilizer 30 are provided with holes 130 and 131 respectively matching the holes 125 in the anchor body 101, so that the pins 128 when projected pass through the several holes and securely fasten the buoy in a retracted position as shown in Fig. 5 of the drawings.

The lower end of the piston 118 is drilled and tapped to receive the safety screw 140 which is equipped with a disc 141 attached thereto and adapted to engage the flared end of the hole. When the safety screw 140 is in place, the piston is prevented from rising so as to release the anchor 100 and the stabilizer 30 from their retracted positions, and the buoy will be unaffected by ordinary handling prior to launching.

The anchor body 101 contains a plurality of indentations 145 on its exterior surface, each adapted to receive an anchor fluke 147. Each anchor fluke 147 is provided with a spade and a projection 148 adapted to be engaged by the lower end of the buoy body when the anchor is attached thereto, and is hingedly attached to the anchor body so as to assume a near-perpendicular position relative to the anchor body 101 when released. When the anchor 100 is moved on the bottom of the ocean, one or more of the flukes 147 engage in the bottom. It will be apparent that the shape of the fluke 147 and the indentation 145, as best seen in Fig. 3, will prevent the fluke from moving past a desired angular location with respect to the anchor body 101.

The length of the mooring line interconnecting the buoy body 11 and the anchor 100 is adjustable by means of a mechanism contained in the anchor body 101. A reel 150 adapted to fit in the intermediate cavity 107 in the anchor body 101 and to rotate freely about the pintle tube 112 is wound with flexible cable 152 in smooth layers thereon. A plurality of holes 153 are provided in the upper flange of the reel 150 for engagement of the stop member 165 later to be described. The free end of the cable 152 is attached to the lower end of the buoy body 11 in any suitable manner, and a guide bushing 155 is secured in the support plate 113 to allow the cable 152 to pay out smoothly without injury thereto.

The length of cable 152 payed out from the reel 150 causes the diameter of the cable remaining on the reel to be reduced in proportion to the length removed. If the cable is initially wound to a predetermined diameter, the diameter of the partially wound spool is a measure of the length of cable removed and the diameter reduces in steps determined by the size of the cable as layer after layer is removed. The stop mechanism employed in the present invention prevents further rotation of the reel 150 after a predetermined spool diameter has been reached.

Referring to Fig. 4, the follower arm 158 is spring-biased to bear against the cable 152 wound on the drum 150 by the spring 159, and movement of the follower arm 158 is transmitted through the shaft 160 to the pawl 164. The shaft 160 is supported by the bracket 162 which is fastened to the anchor body 101 in well-known fashion. The stop member 165 is pivotally supported from the anchor housing 101 by means of block 170 and is provided with a pin 166 adapted to engage one of the holes 153 in the flange of the reel 150 when the stop member is permitted to drop. To insure that the stop member 165 will drop when released, it is spring-biased by means of the spring 167 in addition to its own weight.

The stop member 165 is maintained in a raised position by means of the pawl 164 until the spool diameter of the reel 150 reached a sufficiently small diameter to allow the spring 159 to rotate the pawl from beneath the stop member. The diameter of the reel 150 at which the pawl releases the stop member 165 is adjusted by changing the spacing of the block 170 from bracket 162. As shown in Figs. 6 and 7, the block 170 is fitted into the slot 176 in the anchor body 101, the slot being wider than the block to provide a considerable amount of lateral movement of the block 170 relative to the anchor body 101.

The bracket 162 is secured to the anchor body 101 in a suitable position adjacent to but laterally displaced from the slot 176, so that lateral movement of the block 170 in the slot 176 varies the projection of the pawl 164 beneath the stop member 165 and hence the angular rotation of the shaft 160 required to release the stop member 165. Although any suitable mounting may be employed, as herein illustrated the bracket 162, the shaft 160, and the spring 159 are fitted within the recess 177 in the anchor body 101.

The pawl 164 is carried by the shaft 160 and rotates in a plane parallel to and above the upper end of the drum 150, sufficient clearance being provided therebetween to prevent interference of the parts. The follower arm 158 is also carried by the shaft 160, and is biased to bear on the cable 152 wound on the drum 150 by the spring 159, the spring 159 producing sufficient torque to overcome the friction between the pawl 164 and the stop member 165.

The lateral position of the block 170 relative to the pawl 164 and the anchor body 101 may be adjusted by any suitable means, such as the eccentric 172 fitted snugly into the hole 180 in the anchor body 101 and retained therein by means of the collar 181 and any suitable means 182. The pin 173 on the inner end of the eccentric in a position displaced from the center of the eccentric engages in the vertical slot 174 in the block 170. It will be readily apparent that rotation of the eccentric 172 will move the block 170 and the stop member 165 carried thereon toward and away from the shaft 160 which carries the pawl 164, so that the angular position of the eccentric 172 is a measure of the diameter of the drum 150 at which the stop member 165 is released to lock the drum 150.

A means for engaging the eccentric 172 with a tool is provided, such as the screwdriver slot 175, the screwdriver slot also serving as an indicator for the angular position of the eccentric. Suitable calibration marks 183 are provided on the exterior of the anchor body 101 as indicated in Fig. 2.

The arm 158 moves inward only when a layer of cable is removed from the reel 150, so that the stop mechanism operates at intervals determined by the length of cable wrapped in a layer. The accuracy of the length setting may be increased by reducing the length of the drum, thus increasing the number of layers of cable wrapped around the reel and reducing the length of cable in each layer. However, the diameter of the reel 150 would be increased in order to maintain the same capacity of cable. In the device herein described, the winding space on the reel 150 is about 8 inches long by 6 inches in diameter with a barrel diameter of about 2½ inches. The reel holds approximately 1000 feet of $\frac{1}{16}$ inch steel cable, each layer containing an average of about 50 feet of cable.

The buoy is assembled by inserting the electronic equipment and batteries in the chamber 18 and sealing the buoy. The stabilizer 30 is moved to its retracted position and the antenna mast 60 is pushed into the support tube 50. The bracket 134 is attached to the post 123 in the desired position, after which the anchor 100 is positioned on the buoy body 11 and the piston 118 is pulled down by means of a removable threaded rod (not shown) screwed into the threaded hole in the bottom of the piston 118, thus extending the pins 129 through the holes 125 and securing the anchor 100, the stabilizer 30 and the buoy body together. After the removable threaded rod is unscrewed and removed, the safety screw 140 is inserted, and a protective cap 189 is inserted in the top of the antenna support tube 50 to protect the antenna from damage before launching.

The buoy may be carried in a bomb rack under the wing of an airplane. In such use, it is desirable to employ a small parachute in the well-known manner to insure the buoy striking the water in an upright position. Since such techniques are well-known, no description is needed here. The safety screw 140 and the disc 141 are removed and the eccentric 172 is set for a mooring line length considerably longer than the depth of water expected so as to provide sufficient slack to enable the anchor flukes 147 to grab and to ensure the anchor reaching the bottom in case of error in determining the depth of the water. When the buoy is launched from surface craft, it is dropped point first into the water without a parachute.

When the buoy strikes the water, the kinetic energy of the buoy moving into the water causes the water to exert a kinetic pressure on the piston 118, which is directly exposed to the water at the forward end of the buoy. The piston 118 is forced up the pintle tube 112 and releases the arms 127, after which the springs 132 withdraw the pins 128, releasing the anchor 100 and the stabilizer 30. As the anchor 100 falls away from the buoy body 11, the flukes 147 are released and the cable 152 unwinds from the drum 150. The stabilizer 30 drops on its supporting tubes 32 until the collars 36 strikes the sleeves 34, and in dropping, erects the antenna mast 60 by means of the cable 62.

If desired, a soluble plug may be sealed into the walls of chamber 18 to sink the buoy after the useful life of the device is over. Such a plug may consist of rock salt and be of sufficient size to require a predetermined time to dissolve in sea water, and is well-known to those skilled in the art.

It will be apparent that many changes may be made in the device disclosed. The application for which the buoy is intended will determine the type of radio equipment to be employed. The flukes of the anchor may be omitted if desired and the type of antenna may be changed. If desired the anchor line may be attached to the buoy by means of a bridle rather than by the arrangement shown.

The device herein described may be manufactured and used by or for the Government of the United States of America for governmental purposes without the payment of any royalties thereon or therefor.

What is claimed is:

1. In a radio buoy having a cylindrical body adapted to float in a vertical position in water and containing a water-tight compartment adapted to receive electronic equipment, an antenna housing tube attached to said body, slidable guide means within said tube, an antenna mast carried by said guide means, stabilizer means comprising a pair of sleeves attached to the exterior of said body, a pair of stabilizer rods slidably engaged within said sleeves and an open cylindrical stabilizer having an inside diameter slightly larger than the diameter of said body attached to said rods to telescope over the lower end of said body in a retracted position and to move by gravity to an extended position suspended coaxially below said body by said rods, cable means connecting said guide means to said stabilizer means whereby downward movement of said stabilizer imparts upward movement to said antenna mast, anchor means comprising an anchor adapted to be releasably secured to the bottom of said body and having a diameter larger than the inside diameter of said stabilizer to retain said stabilizer means in a retracted position when said anchor means is secured to said body, a mooring line reel carried by said anchor means, a mooring line wound on said reel having its free end attached to said body, and releasable latch means including pins engaging said anchor means and said body to secure said anchor means to said body, and a piston responsive to kinetic water pressure to release said pins, whereby said anchor means sinks to the bottom of the water and extension of said stabilizer extends said antenna mast.

2. In a radio buoy, a cylindrical body containing a water-tight compartment adapted to receive electronic equipment and adapted to float in a vertical position, stabilizer means extendable by gravity to a position coaxially below said body and comprising a cylindrical stabilizer telescoping over the lower end of said body in a retracted position, support means for said stabilizer including slidable rods and guide means interconnecting said body and said stabilizer, a releasable anchor having a diameter larger than the diameter of said cylindrical stabilizer releasably secured to the lower end of said body to maintain said stabilizer in its retracted position when said anchor is attached to said body, latch means including releasable pins for attaching said anchor to said body, and a piston within said anchor responsive to kinetic water pressure to release said pins, whereby to release said anchor and stabilizer when said buoy strikes the water in launching.

3. In a buoy having a cylindrical body adapted to float vertically in water and adapted to receive electronic apparatus therein, a cylindrical stabilizer having an inside diameter larger than the diameter of said body to telescope around the lower end of said body in a retracted position and slidable support means interconnecting said body and said stabilizer to allow said stabilizer to move by gravity to a position coaxial with and below said body, anchor means releasably attached to the lower end of said body having a diameter larger than the inside diameter of said stabilizer to secure said stabilizer in a retracted position when so attached to said body, said anchor means containing a mooring line reel, a mooring line wound on said reel and having its free end fastened to said body, a pivoted follower arm bearing on said mooring line wound on said reel angularly shiftable to an angular position corresponding to the diameter of said reel, stop means responsive to the angular position of said follower arm to lock said reel at a predetermined reel diameter, means for adjusting the relative spacing between said pivoted follower arm and said stop means to regulate the predetermined reel diameter at which said stop means is operative, releasable latch means for securing said anchor means to said body, and piston means contained in said anchor responsive to vertical movement thereof through the water for releasing said latch means.

4. In a radio buoy, a cylindrical body containing a water-tight compartment adapted to receive electronic equipment and adapted to float in a vertical position in water, an antenna housing tube attached to said body, an antenna mast, guide means slidably engaging the interior of said housing tube and secured to the lower end of said antenna mast, whereby said antenna mast is erected by movement of said guiding means within said housing tube, stabilizer means comprising a pair of sleeves attached to said buoy, a pair of stabilizer rods slidable in said sleeves, and a cylindrical stabilizer attached to said rods having an inside diameter larger than the outside diameter of said body to telescope about the lower end of said body, cable means interconnecting said stabilizer and said guide means to erect said antenna mast by moving said guide means within said antenna housing tube by movement of said stabilizer relative to said body by gravity, and releasable latch means comprising pin means engaging said stabilizer and said body when said stabilizer is in its retracted position and a piston responsive to kinetic water pressure and mechanically linked with said pin means to release said pin means when said piston is actuated by kinetic water pressure, whereby the impact of the buoy with the water in launching releases said stabilizer and erects said antenna mast.

5. In a radio buoy having a cylindrical body adapted to contain electronic apparatus therein and adapted to float in a vertical position in water, an extendable antenna mast carried by said body extendable above said buoy by raising the lower end thereof relative to said body, an extendable stabilizer telescoping around the lower end of said body in a retracted position and secured coaxially below said body in an extended position, releasable anchor means attached to the lower end of said body having a diameter larger than the diameter of said stabilizer to maintain said stabilizer in a retracted position when said anchor is attached to said body, mechanical means interconnecting said antenna mast and said stabilizer whereby downward movement of the stabilizer raises the lower end of said antenna mast relative to said body, releasable latching means for attaching said anchor means to said body, a mooring line carried by said anchor and interconnecting said anchor and said body, and a piston carried within said anchor responsive to water pressure created by vertical movement of said buoy therein connected with said releasable latch means to release said anchor from said body.

6. In an anchor for use with a buoy having a downwardly extending flange forming a recess therein and holes in the flange, said anchor having a flange adapted to extend within the buoy recess, a plurality of holes in said anchor flange adapted to be aligned with the holes in flange of the buoy, a plurality of pins removably fitted within said holes, a plurality of springs to withdraw said pins from said holes, a block, a plurality of struts pivotally interconnecting said block and said pins whereby said struts and said block form a toggle joint, a vertical tube extending through said anchor, a piston within said vertical tube, means on said block limiting the downward movement of said piston within said tube, means securing said block to said piston, whereby said springs tend to hold said piston down and said toggle joint holds said pins in an extended position until said piston is moved upwardly by kinetic water pressure within said vertical tube, a reel pivotally mounted on said tube, a mooring line wound on said reel having its free end attached to the buoy, a follower arm pivotally mounted on said anchor, a spring biasing said follower arm to bear on said wound reel, a pawl coupled to said follower arm, a stop member pivotally mounted to said anchor and adapted to engage said reel and held from said reel by said pawl while the diameter of said reel exceeds a predetermined radius and means carried by said anchor for varying the position of said stop member relative to said pawl, whereby to vary the release point of said stop member.

7. The anchor for a buoy as claimed in claim 6 which includes a plurality of flukes hingedly attached at their lower end to said anchor, the upper end of said flukes being adapted to fit within the flange of the buoy when said anchor is attached to the buoy, whereby, said flukes are maintained in a folded position until said anchor is released from the buoy.

ROYAL V. KEERAN.

REFERENCES CITED

The following references are of record in the file of this patent:

UNITED STATES PATENTS

| Number | Name | Date |
| --- | --- | --- |
| 1,308,003 | Elia | June 24, 1919 |
| 1,427,560 | Sperry | Aug. 29, 1922 |
| 2,310,017 | Canon et al. | Feb. 2, 1943 |
| 2,402,143 | Arenstein | June 18, 1946 |
| 2,470,783 | Mead | May 24, 1949 |

FOREIGN PATENTS

| Number | Country | Date |
| --- | --- | --- |
| 21,840 | Great Britain | of 1907 |